United States Patent [19]

Salant et al.

[11] Patent Number: 5,487,550
[45] Date of Patent: Jan. 30, 1996

[54] SECONDARY GAS/LIQUID MECHANICAL SEAL ASSEMBLY

[75] Inventors: Richard F. Salant; Itzhak Green, both of Dunwoody, Ga.; Larry A. Hufford, Vista; Oley Giles, Glendale, both of Calif.

[73] Assignee: BW/IP International, Inc., Long Beach, Calif.

[21] Appl. No.: 67,487

[22] Filed: May 26, 1993

Related U.S. Application Data

[63] Continuation of Ser. No. 792,517, Nov. 12, 1991, abandoned.

[51] Int. Cl.⁶ ............................................. F16J 15/38
[52] U.S. Cl. ......................... 277/65; 277/82; 277/96.1
[58] Field of Search ............................. 277/96.1, 82, 85, 277/94, 133, 65

[56] References Cited

U.S. PATENT DOCUMENTS

| | | | |
|---|---|---|---|
| 3,744,805 | 7/1973 | Heinrich | 277/96.1 |
| 3,746,350 | 7/1973 | Mayer et al. . | |
| 3,749,412 | 7/1973 | Lingley | 277/96.1 |
| 4,103,907 | 8/1978 | Inouye et al. | 277/96.1 |
| 4,415,168 | 11/1983 | Takenaka et al. . | |
| 4,444,399 | 4/1984 | Yanai et al. | 277/96.1 |
| 4,714,257 | 12/1987 | Heinrich et al. . | |
| 4,834,400 | 5/1989 | Lebeck | 277/96.1 |
| 4,836,561 | 6/1989 | Lebeck et al. | 277/96.1 |
| 4,889,348 | 12/1989 | Amundson et al. | 277/96.1 |
| 4,908,081 | 3/1990 | Heinrich et al. . | |
| 4,973,068 | 11/1990 | Lebeck . | |
| 5,053,093 | 10/1991 | Ciccarelli et al. . | |
| 5,058,905 | 10/1991 | Nosowicz et al. | 277/96.1 |
| 5,071,141 | 12/1991 | Lai et al. | 277/96.1 |
| 5,090,712 | 2/1992 | Pecht et al. . | |
| 5,092,612 | 3/1992 | Victor et al. . | |
| 5,201,531 | 4/1993 | Lai . | |
| 5,224,714 | 7/1993 | Kimura et al. . | |

FOREIGN PATENT DOCUMENTS 2844335  4/1980  Germany .

OTHER PUBLICATIONS

Heinrich, J., Rosenfelder, O., Benker, W., and Schelter, H., Aspects of Material and Design of Optimized Silicon Carbide Seal Rings, 47 Lubrication Engineering 367–372 (May 1991).

*Primary Examiner*—Daniel G. DePumpo
*Attorney, Agent, or Firm*—Pretty, Schroeder, Brueggemann & Clark

[57] ABSTRACT

A secondary mechanical seal assembly is used on a shaft that is rotatable within a housing to seal both gaseous and liquid medium. The assembly includes a stationary seal face element that is fixed relative to the housing and a rotating seal face element that is fixed relative to the shaft. One of the seal face element back surfaces includes at least one slot configured to produce a wave on the front surface of the seal face element when the shaft is rotated. The wave creates an opening force that is sufficient to control wear and prolong seal life when the secondary seal assembly is exposed to a gaseous medium. When exposed to a pressurized liquid medium, the hydrodynamic loading from the liquid medium alters the seal face element waviness, and increases the closing force due to the action of the pressurized liquid on the back surface of the seal face elements, such that excessive leakage is prevented.

15 Claims, 3 Drawing Sheets

SECONDARY GAS/LIQUID MECHANICAL SEAL ASSEMBLY

This application is a continuation of application Ser. No. 07/792,517, filed Nov. 12, 1991 now abandoned.

BACKGROUND OF THE INVENTION

1. Field of the Invention

This invention relates generally to mechanical seal assemblies and, more particularly, to secondary mechanical seal assemblies that can seal a gas and also a liquid.

2. Description of the Related Art

A mechanical seal assembly seals a shaft that is rotatable within a housing and includes a pair of opposed seal face elements, one stationary seal face element that does not rotate relative to the housing and one rotating seal face element that rotates with the shaft. One of these seal face elements is free to move axially toward the other one. Such seal assemblies, for example, can be used in pump systems to seal the pump shaft against either a liquid medium or a gaseous medium to substantially prevent the medium from flowing along the shaft and out the housing to the atmosphere. The seal face elements are pressed together at their opposing front surfaces by a closing force, which typically is supplied by one or more axially-oriented springs and the pressure of the sealed medium on the back side of the seal face elements.

In general, mechanical seal assemblies that are used to seal a liquid medium have seal face elements with opposing surfaces that are flat. The opposing surfaces do not actually come in contact with each other because the liquid medium has sufficient pressure to push the seal face elements slightly apart, providing an opening force. The opening force allows a thin film of the liquid medium to act as a lubricating film between the seal surfaces, on the order of a few microns, that prolongs seal life and reduces seal wear. In general, mechanical seal assemblies that are used to seal a gaseous medium have seal face elements with opposing surfaces that are provided with stepped pads or spiral grooves. Because a gaseous medium provides less efficient lubrication than a liquid medium, the stepped pads or spiral grooves are needed to create surface deformities that generate a sufficient opening force to push apart the seal face elements. The seal face elements are thereby kept apart, which prolongs seal life and reduces seal wear.

In critical operations, or applications where a volatile medium is involved, it is often necessary to provide a redundant sealing system that will prevent the medium from flowing to the atmosphere, contain a leak, and meet safety requirements for stable operation of the system. A redundant sealing system includes a primary seal assembly that seals the system medium from flowing along the shaft and a secondary seal assembly that seals the very minute leaks usually produced by the primary seal assembly and that temporarily seals the system in the event of a sudden failure of the primary seal assembly.

If the redundant sealing system is to seal against a liquid medium, the redundant sealing can be provided by a tandem seal design having a primary liquid mechanical seal assembly, a secondary liquid mechanical seal assembly spaced apart from the primary seal assembly, and an auxiliary liquid buffer reservoir and support system between the two seal assemblies. The liquid buffer effectively seals the liquid medium from the secondary seal assembly. In this way, only the liquid buffer is allowed to leak past the secondary seal assembly to the atmosphere. Although tandem liquid seals provide redundant sealing of the media and are reliable, they can be costly because of the additional equipment and maintenance requirements.

The very minute leaks usually produced by a primary liquid-type seal assembly often are of the gaseous phase. This occurs because the liquid medium, in escaping from the primary liquid-type seal assembly, is converted to a gaseous phase. Therefore, the secondary seal assembly can be provided by a gas-type seal assembly. Because the secondary seal assembly also must maintain a seal if the primary seal fails, the secondary seal assembly must be capable of operating as a gas-type seal and transitioning to a liquid-type seal. Unfortunately, the opening forces generated by a conventional gas-type seal assembly with stepped pads or spiral grooves are such that excessive leakage results when a liquid medium is introduced. Moreover, the stepped pads or grooves can become fouled with debris or worn off during dry operation, losing their effectiveness and resulting in excessive wear.

From the discussion above, it should be apparent that there is a need for a relatively simple and inexpensive secondary seal assembly that can seal a gas medium without suffering from excessive wear or fouling and that also can transition to seal a liquid medium without suffering from excessive leakage. The present invention satisfies this need.

SUMMARY OF THE INVENTION

The invention is embodied in a mechanical seal assembly having opposing seal face elements that are axially pressed together by a closing force, the back surface of one seal face element having one or more slots that generate waves on the front surface of the seal face element due to non-axisymmetric mechanical and thermal deformation. The waves generated on the front surface provide the opening force necessary to seal a gaseous medium. When the seal face elements encounter a pressurized liquid medium, however, the liquid medium alters the waves produced by the back surface slots and transitions the seal elements to operation as a liquid seal design, without excessive leakage.

The slots and geometry of the seal face elements are configured for stable operation and minimal leakage of a gaseous medium. The seal face elements are also structured so that hydraulic loading on the elements by a liquid medium alters the waves generated on the front surface and increases the closing force due to the action of the pressurized liquid on the back surface of the seal face elements. This minimizes the thickness of the lubricating film and thereby prevents excessive liquid leakage. In this way, the seal face elements operate well under both gaseous and liquid phases.

Thus, the seal face elements can operate as a secondary seal in the gaseous phase without excessive wear when the primary seal is functioning, but can also operate as a secondary seal in the liquid phase without excessive leakage when the primary seal fails and the secondary seal is exposed to a liquid medium. No buffer reservoir or separate source of lubricating film is needed between the primary and secondary seal assemblies.

The seal face element having back surface slots can be either the stationary seal face or the rotating seal face. It is preferred, however, that the rotating seal face have the slots because centrifugal force increases the wave action to provide better gas-sealing performance as compared with slots in the stationary seal face element, without excessive leakage of the liquid medium. For easier manufacturing, the slots are centered along radial lines and have parallel edges. Alternatively, the slots can have non-parallel edges, including, for example, either straight, radially diverging edges or curved edges. Good sealing performance has been obtained with slots having a depth equal to approximately one-half the thickness of the seal face element. The width, depth, number, and orientation of the slots can be adjusted as needed, depending on the seal face element size and material, to arrive at an optimal combination of gaseous medium and liquid medium sealing performance.

Other features and advantages of the present invention should be apparent from the following description of the preferred embodiments, taken in conjunction with the accompanying drawings, which illustrate, by way of example, the principles of the invention.

DESCRIPTION OF THE PREFERRED EMBODIMENTS

Figure 1:
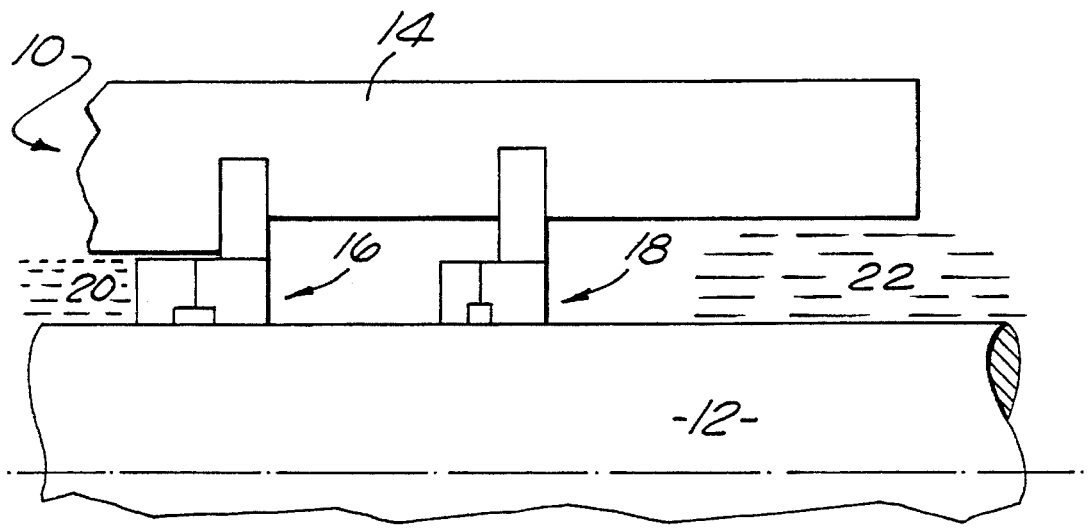
FIG. 1 is a cross-sectional schematic view of a mechanical seal assembly having a primary liquid-type seal assembly and a secondary gas/liquid seal assembly in accordance with the invention.
Figure 2:
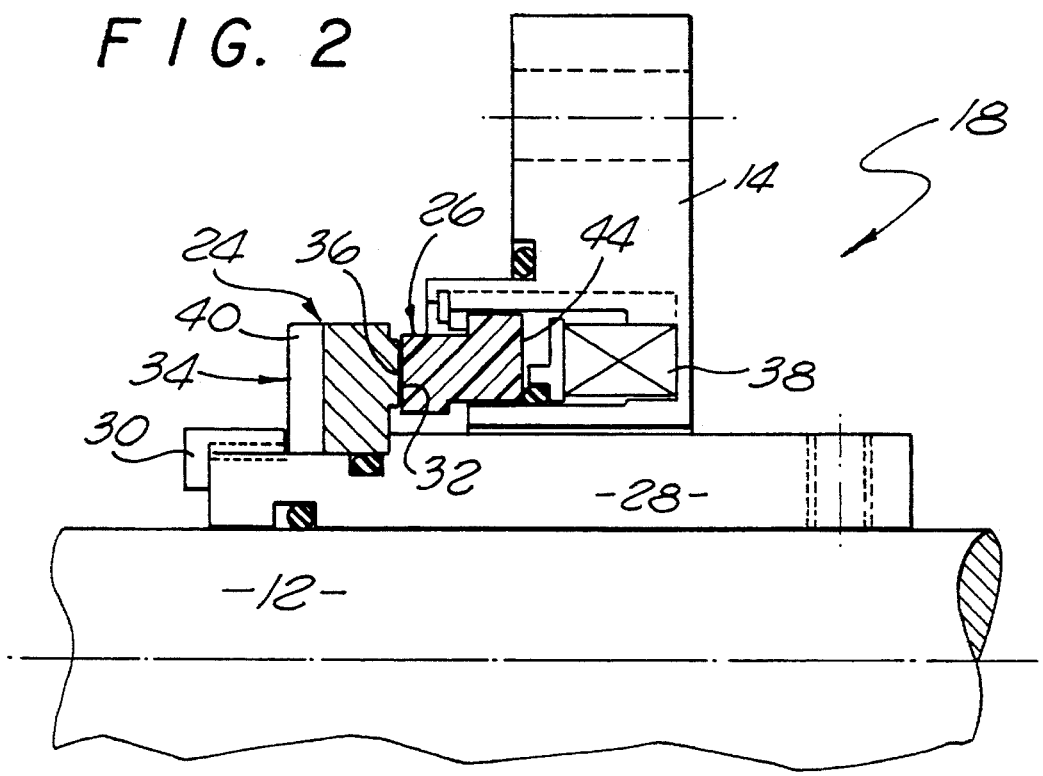
FIG. 2 is a cross-sectional schematic view of the secondary gas/liquid seal assembly illustrated in FIG. 1, with the rotating seal face element having back-surface slots.

Referring to the drawings, and in particular to FIGS. 1 and 2, there is shown a mechanical seal assembly 10 for use on a shaft 12 that can rotate within a housing 14. The mechanical seal assembly includes a primary mechanical seal assembly 16 and a secondary gas/liquid seal assembly 18. Details of the seal assemblies are not shown in FIG. 1 for simplicity. The primary seal assembly 16 seals a liquid medium 20, substantially preventing it from moving along the shaft 12 toward the atmosphere 22. The secondary seal assembly 18 seals a minute amount of the liquid medium that is transformed by the primary seal assembly to a gaseous phase and also seals the liquid medium if the primary seal assembly fails, until the primary seal assembly can be repaired or replaced. Repair or replacement can typically be accomplished within 24 to 48 hours. The secondary seal assembly seals a gaseous medium without excessive wear because it provides a sufficient opening force and also seals a pressurized liquid medium without excessive leakage because hydraulic loading on the seal face elements by the liquid medium alters the opening force and increases the closing force sufficiently to minimize the thickness of the lubricating film and prevent excessive liquid leakage. The secondary seal assembly 18 requires no buffer reservoir or other complicated lubrication system for gas operation.

Referring to FIG. 2, the secondary seal assembly 18 includes two annular seal face elements 24 and 26 that are axially pressed together. The rotating seal face element 24 is attached to a sleeve 28 by a torque nut 30. The sleeve is attached to the shaft 12 and therefore the rotating seal face element 24 rotates with the shaft. The rotating seal face element includes a flat front surface 32 and a back surface 34. The stationary seal face element 26 includes a flat front surface 36. The stationary seal face element does not rotate relative to the housing 14 and is pressed against the rotating seal face element 24 by a closing force generated by a spring 38 and by the pressure of the sealed medium on the back surface of the element.

The secondary seal assembly 18 can seal a gaseous medium without excessive wear because an opening force is provided by a plurality of grooves 40 that are provided in the back surface 34 of the rotating seal 24. The grooves generate waves on the front surface 32 that generate a pressure distribution in the thin film, thereby producing an opening force that drives the seal face elements apart. The front surface 32 of the rotating seal face element undergoes deformation that creates a wave profile on the front surface. The waviness produces an alternating converging and diverging space between the front surfaces of the seal face elements 24 and 26. In particular, each groove 40 produces a converging and diverging cycle on the front surface 32. The secondary mechanical seal assembly 18 seals a liquid medium because, when exposed to a pressurized liquid medium, the hydrodynamic loading from the liquid medium alters the seal face element waviness and increases the closing force, due to the action of the pressurized liquid on the back surface of the seal face elements. As a result, the seal face elements 24 and 26 are pressed together sufficiently to provide a seal against a liquid medium without excessive leakage.

Figure 3A:
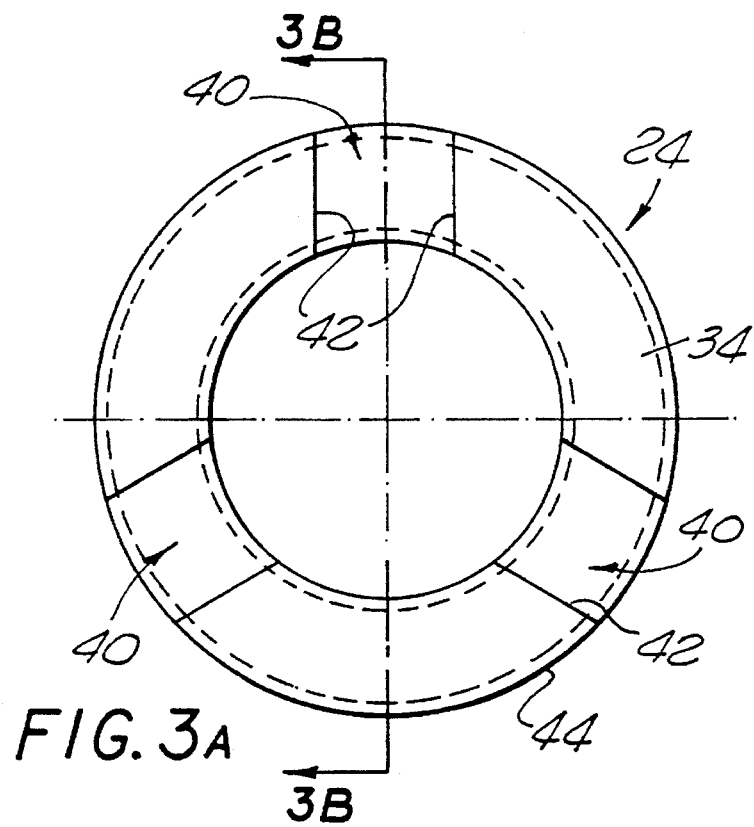
FIGS. 3A and 3B are back surface and cross-sectional schematic views, respectively, of the rotating seal face element illustrated in FIG. 2.
Figure 3B:
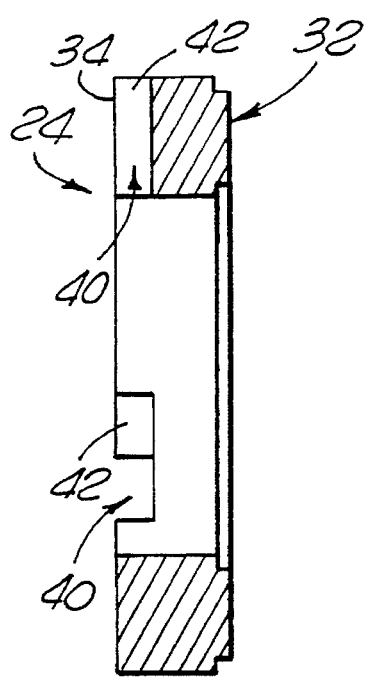

The rotating seal face element 24 is shown in greater detail in FIGS. 3A and 3B. The back surface 34 of the seal face element 24 is shown with three slots 40, or grooves. The slots are radially-oriented, having parallel side edges 42 that are equidistant from a radial line extending from the axial center of the seal face element 24 toward the outside circumference 44. Because three slots are illustrated in the seal face element 24, a series of three alternating converging and diverging deformities will be formed on the front surface 32 of the element.

It is to be understood that a greater or lesser number of slots 40 can be formed in the seal face element 24. The edges 42 of the slots can be parallel with a radius extending from the center of the seal face element toward the outer circumference of the element, or can be non-parallel and aligned with different radii, or can be curved. The illustrated configuration in FIGS. 3A and 3B was selected as the least number of slots and simplest geometry that provide good seal performance, minimizing the manufacturing cost.

Figure 4A:
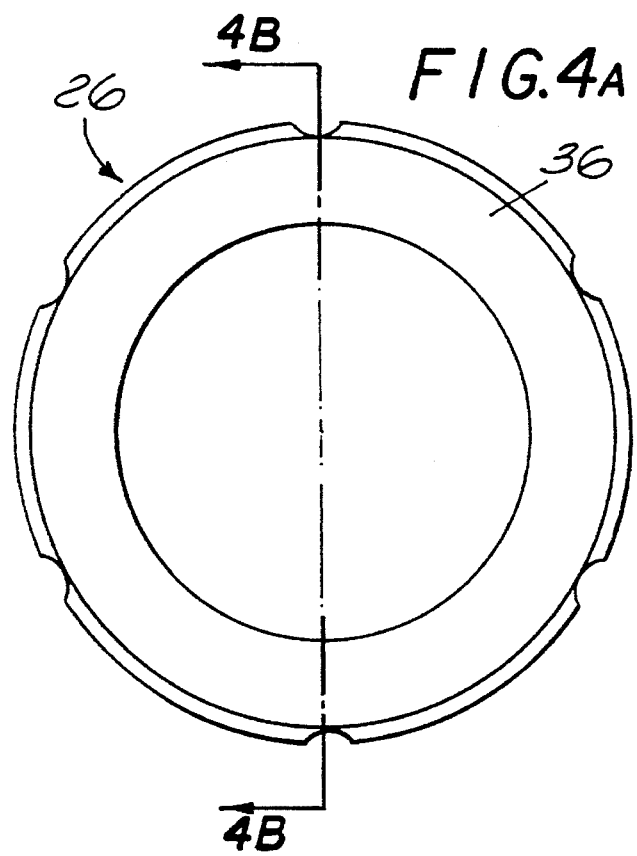
FIGS. 4A and 4B are front surface and cross-sectional schematic views, respectively, of the stationary seal face element illustrated in FIG. 2.
Figure 4B:
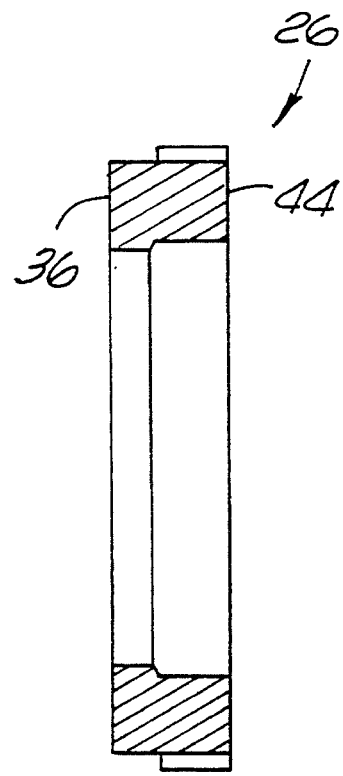

The stationary seal face element 26 is illustrated in FIGS. 4A and 4B, which show that the element has a flat profile on its front surface 36. The stationary seal face element also includes a flat back surface 44, which is configured to fit in the housing 14, as illustrated in FIG. 2.

Figure 5A:
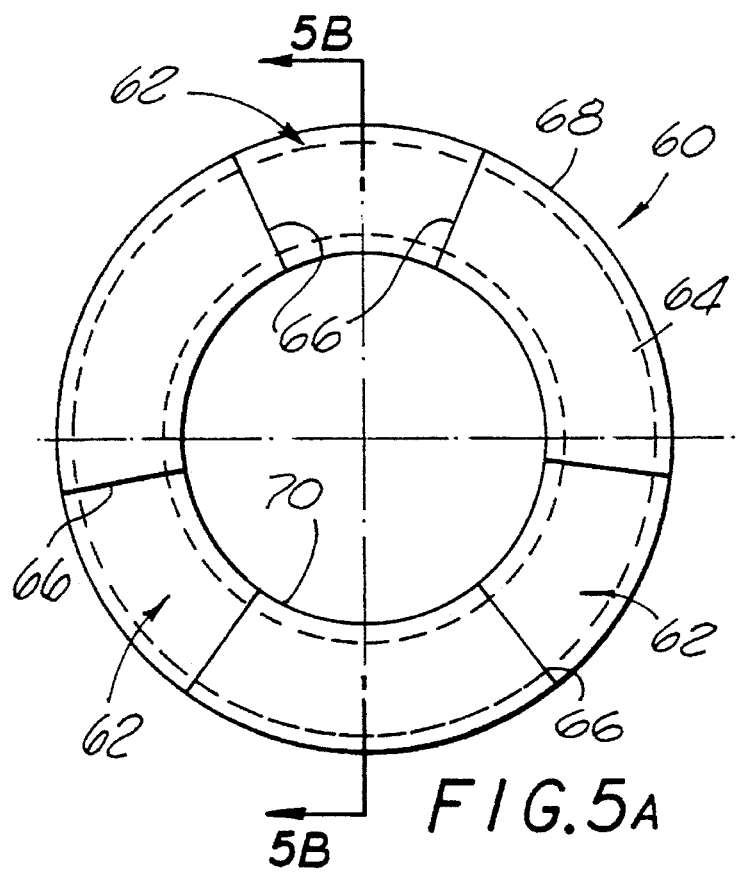
FIGS. 5A and 5B are back surface and cross-sectional schematic views, respectively, of a seal face element in accordance with the invention having back-surface slots with non-parallel edges.
Figure 5B:
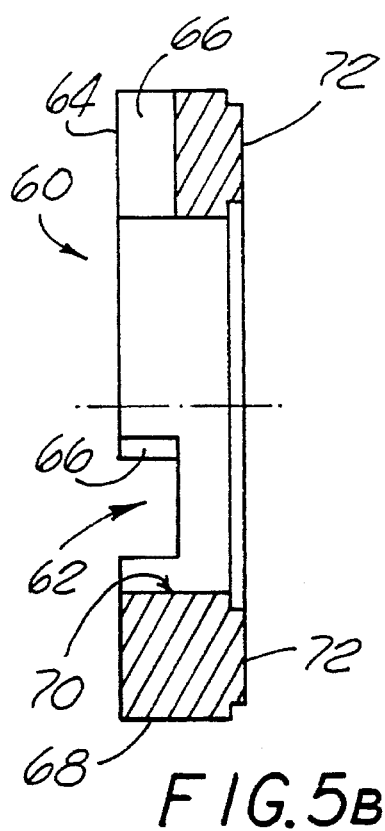

FIGS. 5A & 5B show an alternative seal face element 60 in accordance with the invention having an annular shape similar to the seal face element 24 shown in FIGS. 3A and 3B, and having three radial slots 62 in its back surface 64. Unlike the slots 40 of the FIG. 3A and FIG. 3B embodiment, however, the edges 66 of the FIG. 5A and FIG. 5B slots 62 are non-parallel and are aligned with different radii. Thus, the width of each slot 62 varies such that the width is greater at the outer circumference 68 of the seal face element than at the inner circumference 70. The front surface 72 of the seal face element 60 is substantially flat.

Figure 6:
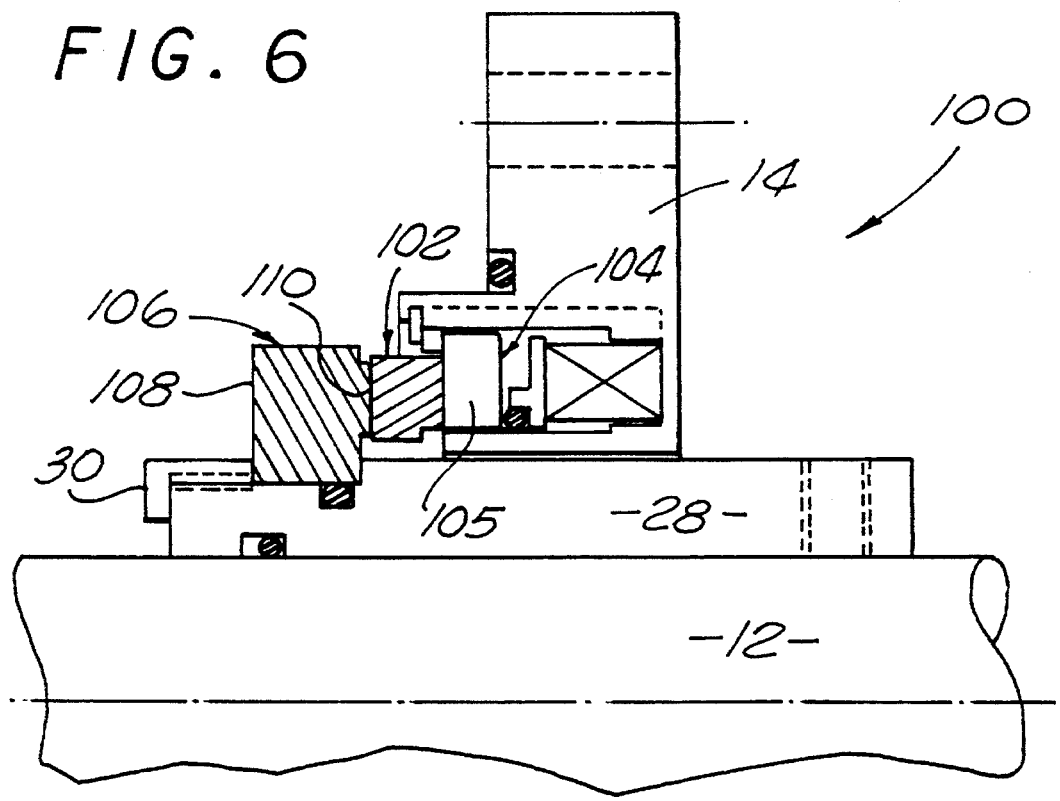
FIG. 6 is a cross-sectional schematic view of a secondary gas/liquid seal assembly in accordance with the invention, with the stationary seal face element having back-surface slots.

FIG. 6 shows an alternate embodiment of a secondary gas/liquid seal assembly 100 in which a stationary seal face element 102 includes a plurality of slots 105 in its back surface 104. The stationary seal face element is pressed against a rotating seal face element 106, which does not have slots in its back surface 108. The slots in the back surface of the stationary seal face element will generate waves in the front surface 110 of the stationary seal face element when the rotating seal face element 106 is rotated by the shaft 12. The secondary seal assembly 100 will seal a gaseous medium because the surface waves in the stationary seal face element will produce an opening force sufficient to keep the stationary and rotating seal face elements apart, and will seal a liquid medium because hydrodynamic loads produced by the liquid medium will reduce the opening force provided by the surface waves and will prevent excessive leakage of the liquid medium.

The present invention has been described above in terms of presently preferred embodiments so that an understanding of the present invention can be conveyed. There are, however, many configurations for seal assemblies not specifically described herein, but with which the present invention is applicable. The present invention should therefore not be seen as limited to the particular embodiments described herein, but rather, it should be understood that the present invention has wide applicability with respect to seal assemblies of a wide variety of configurations. Such alternate configurations can be achieved by those skilled in the art in view of the descriptions herein.

We claim:

1. A mechanical seal assembly for preventing the flow of liquid along a shaft that is rotatable within a housing, the mechanical seal assembly comprising:

a primary mechanical seal assembly mounted around the shaft for preventing the flow of liquid along the shaft such that, in normal operation, a liquid medium exists on an upstream side of the primary mechanical seal assembly and a gaseous medium exists on a downstream side of the primary mechanical seal assembly; and a secondary mechanical seal assembly mounted around the shaft on the downstream side of the primary mechanical seal assembly such that, in normal operation, the gaseous medium exists on an upstream side of the secondary mechanical seal assembly and, upon failure of the primary mechanical seal assembly, the liquid medium exists on the upstream side of the secondary mechanical seal assembly, the secondary mechanical seal assembly comprising a stationary seal face element having a front surface and a back surface, and rotationally fixed relative to the housing, and a rotating seal face element having a front surface and a back surface, and fixed relative to the shaft, the front surfaces of the seal face elements being in opposed relation to one another, wherein the back surface of the stationary seal face element includes a slotted configuration that, during normal operation, generates a wave on the front surface of the stationary seal face element sufficient to generate an opening force to drive the seal face elements apart and provide a seal against the gaseous medium, and wherein, upon failure of the primary mechanical seal assembly, a resulting hydrodynamic loading of the liquid medium on the seal face elements transitions the secondary mechanical seal assembly to provide a seal against the liquid medium.

2. A mechanical seal assembly as defined in claim 1, wherein the stationary seal face element includes three back-surface radial slots that are spaced equally apart.

3. A mechanical seal assembly as defined in claim 1, wherein the back-surface slot has a depth equal to approximately one-half the thickness of the slotted seal face element.

4. A mechanical seal assembly as defined in claim 1, wherein each slot extends radially from the inside circumference of the seal face element to the outside circumference of the seal face element.

5. A mechanical seal assembly as defined in claim 4, wherein the edges of each slot are parallel.

6. A mechanical seal assembly as defined in claim 4, wherein the edges of each slot are non-parallel such that the width of each slot at the outer circumference of the seal face element is greater than the width of each slot at the inner circumference of the seal face element.

7. A mechanical seal assembly as defined in claim 1, wherein the slotted seal face element includes a plurality of back-surface slots that are equally spaced apart.

8. A mechanical seal assembly for sealing a liquid medium within a housing having a rotatable shaft passing therethrough, the mechanical seal assembly comprising:

a primary mechanical seal assembly mounted around the shaft for sealing the liquid medium such that, in normal operation, the liquid medium exists on an upstream side of the primary mechanical seal assembly and a gaseous medium, resulting from minute leakage of the liquid medium through the primary mechanical seal face assembly, exists on a downstream side of the primary mechanical seal assembly; and a secondary mechanical seal assembly mounted around the shaft on the downstream side of the primary mechanical seal assembly such that, in normal operation, the gaseous medium exists on an upstream side of the secondary mechanical seal assembly and, upon failure of the primary mechanical seal assembly, the liquid medium exists on the upstream side of the secondary mechanical seal assembly;

wherein the secondary mechanical seal assembly includes a first seal face element rotationally fixed relative to the housing and a second seal face element rotationally fixed relative to the shaft, the first and second seal face elements each having a front surface and a rear surface with the front surfaces in opposed relation to one another;

wherein the back surface of the first seal face element includes a slotted configuration that, during normal operation, generates a wave on the front surface of the first seal face element sufficient to generate an opening force to drive the seal face elements apart and operate as a gaseous seal; and wherein, upon failure of the primary mechanical seal assembly, a resulting hydrodynamic loading of the liquid medium on the seal face elements transitions the secondary mechanical seal assembly to operate as a liquid seal.

9. The mechanical seal assembly of claim 8, wherein the first seal face element includes three back-surface radial slots that are spaced equally apart.

10. The mechanical seal assembly of claim 8, wherein the back-surface slot has a depth equal to approximately one-half the thickness of the slotted seal face element.

11. The mechanical seal assembly of claim 8, wherein the slot extends radially from the inside circumference of the seal face element to the outside circumference of the seal face element.

12. The mechanical seal assembly of claim 11, wherein the edges of the slot are parallel.

13. The mechanical seal assembly of claim 11, wherein the edges of the slot are non-parallel such that the width of the slot at the outer circumference of the seal face element is greater than the width of the slot at the inner circumference of the seal face element.

14. The mechanical seal assembly of claim 8, wherein the slotted seal face element includes a plurality of back-surface slots that are equally spaced apart.

15. The mechanical seal assembly as defined in claim 8, wherein the gaseous medium downstream of the primary mechanical seal assembly is sealed from the atmosphere.

\* \* \* \* \*